United States Patent [19]

Saito

[11] Patent Number: 4,640,366
[45] Date of Patent: Feb. 3, 1987

[54] CULTIVATOR

[75] Inventor: Gunji Saito, Tokorozawa, Japan

[73] Assignee: Honda Giken Kogyo Kabushiki Kaisha, Tokyo, Japan

[21] Appl. No.: 609,953

[22] Filed: May 14, 1984

[30] Foreign Application Priority Data

May 13, 1983 [JP] Japan .................... 58-83590

[51] Int. Cl.[4] ............ A01B 33/02; A01B 33/08
[52] U.S. Cl. ................. 172/42; 172/250; 172/256
[58] Field of Search .......... 172/42, 43, 74, 250, 172/256

[56] References Cited

U.S. PATENT DOCUMENTS

| 1,428,194 | 9/1922 | von Meyenburg | 172/125 |
| 2,792,900 | 5/1957 | Howard | 172/43 X |
| 2,998,082 | 8/1961 | Arnot | 172/42 X |
| 3,603,162 | 9/1971 | Gohler | 172/125 X |
| 4,354,564 | 10/1982 | Watanabe | 172/125 X |

FOREIGN PATENT DOCUMENTS

| 1083078 | 6/1960 | Fed. Rep. of Germany | 172/42 |
| 1108500 | 6/1961 | Fed. Rep. of Germany | 172/42 |
| 1356467 | 2/1964 | France | 172/42 |
| 623329 | 7/1961 | Italy | 172/125 |

OTHER PUBLICATIONS

Gravely Tractors, Inc., *Power Versus Drudgery*, pp. 2-5, Jan., 1960, (Gravely Tractors, Inc., Dunbar, W.V., part No. 125M).

*Primary Examiner*—Richard J. Johnson
*Assistant Examiner*—Terrence L. B. Brown
*Attorney, Agent, or Firm*—Armstrong, Nikaido, Marmelstein & Kubovcik

[57] ABSTRACT

A versatile cultivator is provided wherein to a transmission mechanism for transmitting the power of an engine to a cultivating mechanism is operatively connected a power take-off shaft which projects from a lower front portion of a transmission housing accommodating therein the transmission mechanism, and wherein a running wheel unit is removably attached to the lower front portion of the transmission housing, the wheel unit having running wheels rotatably mounted on lateral sides of the front end thereof while being provided with an interlocking mechanism for linking the running wheels to the power take-off shaft. The cultivator can either be used as a rototiller or as a rotary cultivator, simply by mounting or dismounting the running wheel unit.

13 Claims, 7 Drawing Figures

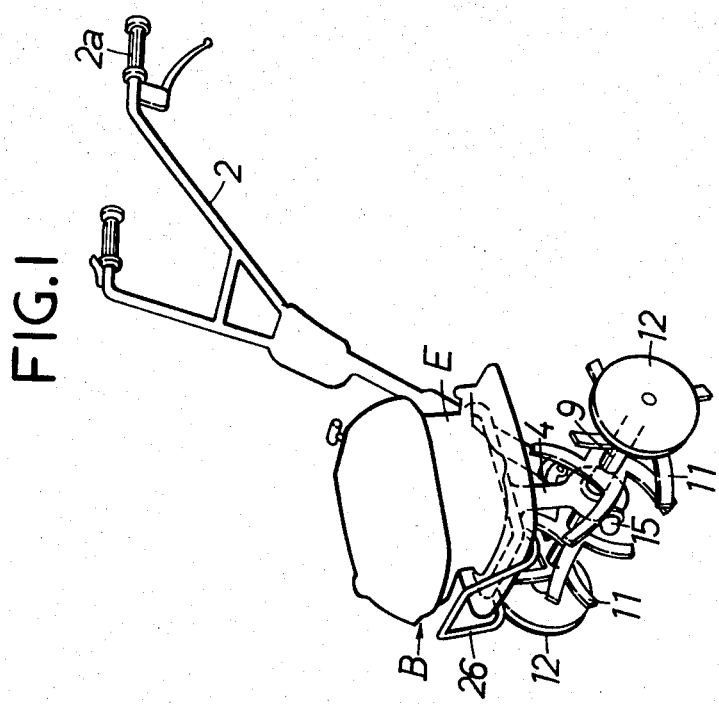
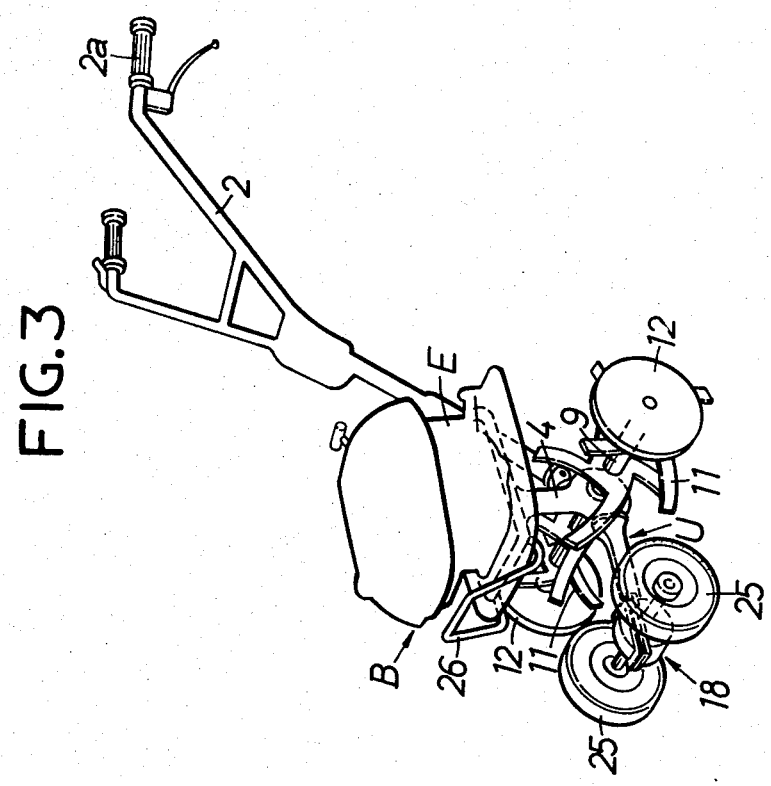

CULTIVATOR

BACKGROUND AND SUMMARY OF THE INVENTION

This invention relates to a cultivator with high utility.

In general, a cultivator is known as an agricultural machine powered by an engine, which breaks up and plows lands and fields, and prepares the soil for planting. It is desirable that such a cultivator has high versatility and can be used for several purposes so that, for instance, its mode of use can be easily shifted, such as between rough plowing and fine plowing, according to the conditions of the ground being tilled, purpose of use, etc. The present invention has as its object the provision of a cultivator which has a simple structure and is especially designed such that it can be used as a rotary cultivator as desired by simply mounting a self-propelled type of running wheel unit onto a Rototiller, without modifying the essential plowing mechanism of the latter.

In order to accomplish this object, the present invention proposes a power-driven cultivator in which a transmission housing is provided extending downward vertically from an engine unit, and an engine-driven cultivating mechanism provided with tiller tines and the like is mounted on a drive shaft passing horizontally and laterally through the lower portion of the transmission housing which houses a transmission mechanism linking the output end of the engine to the drive shaft, and further characterized in that a power take-off shaft which is linked to the transmission mechanism is provided so as to project from the front side of the lower portion of the transmission housing, and a running wheel unit having a pair of running wheels mounted on lateral sides of its front end is detachably secured to the lower front portion of the transmission housing, the wheel unit being provided therein with an interlocking mechanism which interlocks the power take-off shaft with the running wheels.

The present invention also proposes a cultivator of this type in which, in order to increase the stability of the cultivator for facilitating plowing and to simplify the operation of changing its running direction, the running wheels are so designed that their ground-contact point is positioned forward of an extension of the line connecting the center of gravity of the cultivator body portion to the handle grips.

The present invention further proposes a cultivator in which the axle of the running wheels is located forward of a frontguard provided on the front of the cultivator body portion to protect the body portion against any obstacles lying in front thereof, so as to enable the forward tilting of the cultivator to a larger extent when its running direction is being changed so that when, for instance, the cultivator is turned at a point facing a mound of earth or a furrow, an easy and smooth turn can be made without the cultivator being hindered by or damaging such an obstacle.

The invention also proposes use of a reinforcing bar for connecting between the front end of the wheel unit and an upper part of the cultivator body portion to augment its wheel-supporting strength.

These and other objects, features and advantages of the present invention will become apparent from the following detailed description of an embodiment thereof, in conjunction with the accompanying drawings.

BRIEF DESCRIPTION OF THE DRAWINGS

The drawings illustrate an embodiment of the present invention, in which:

FIG. 1 is a perspective view of a Rototiller as an embodiment of the present invention.

FIG. 3 is a perspective view of a rotary cultivator as embodied by the invention.

DETAILED DESCRIPTION OF PREFERRED EMBODIMENT

Figure 2:
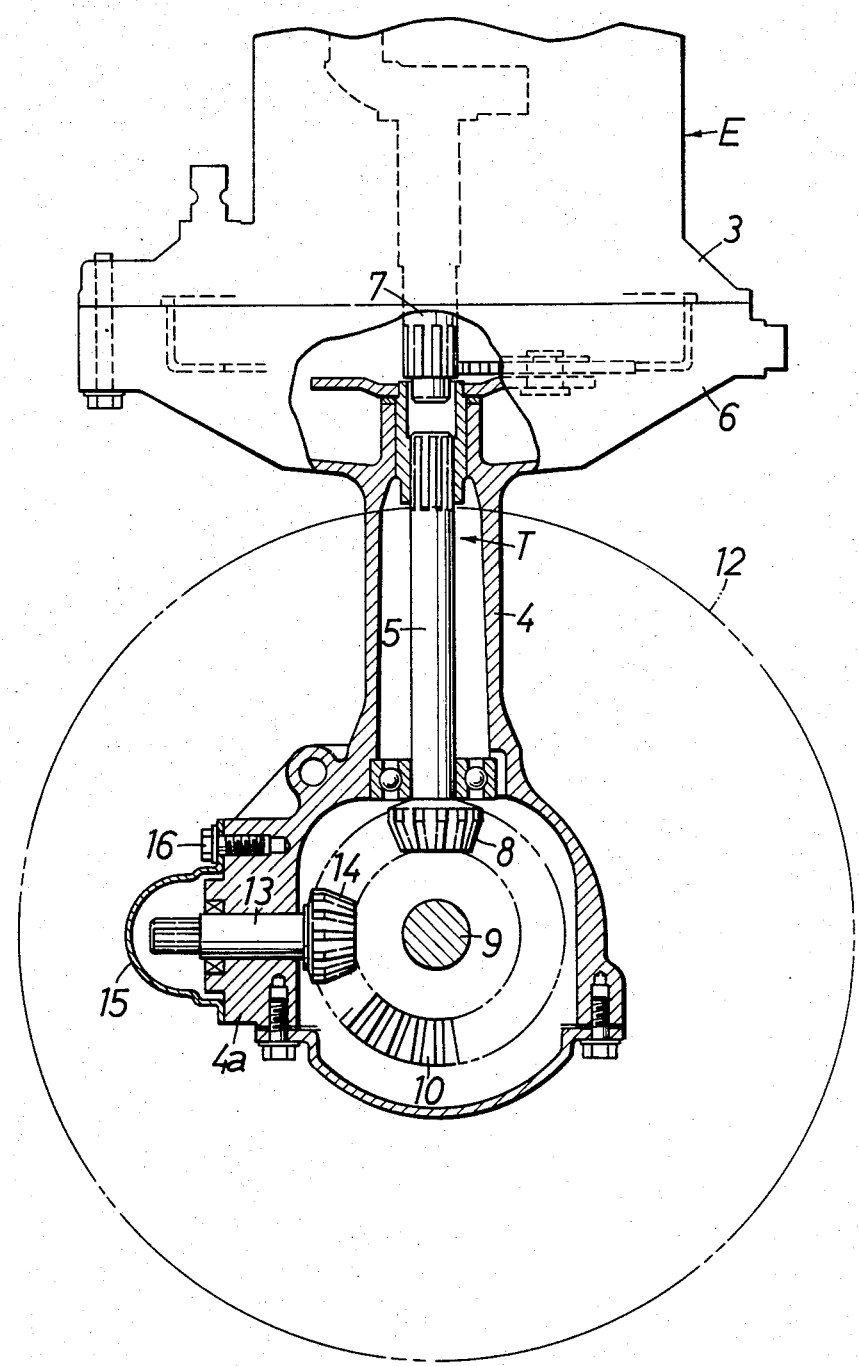
FIG. 2 is an enlarged, partially-sectioned view of the cultivator of FIG. 1.

The present invention will now be described in detail with reference to an embodiment as well as some modifications thereof illustrated in the drawings where identical or corresponding parts are assigned identical reference characters throughout.

Figure 4:
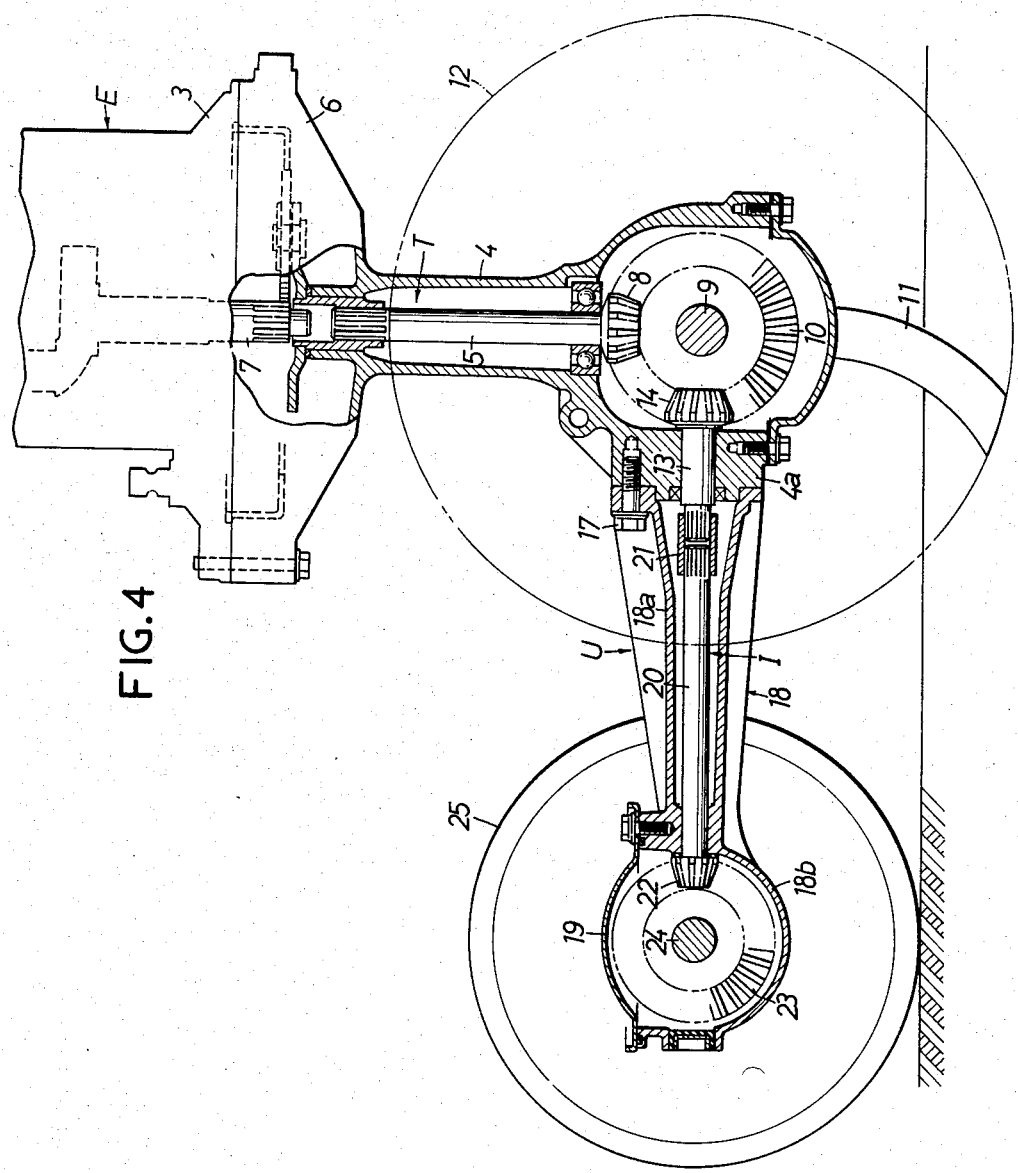
FIG. 4 is an enalrged, partially-sectioned view of the cultivator of FIG. 3.

In the drawings, FIGS. 1 and 2 show a Rototiller according to an embodiment of this invention while FIGS. 3 and 4 show a rotary cultivator obtained by the embodiment.

Referring first to FIGS. 1 and 2, a cultivator body portion B has an engine unit E installed therein, and is also provided with operating handles 2 each having a handle grip 2a at their rear ends. The body portion B is also provided with a frontguard 26 for protecting the engine unit E against any obstacles lying in front of the unit E in such a manner that the frontguard 26 extends forward and upward so as to cover the front side of the engine unit E.

As shown in FIG. 2, a transmission housing 4 is formed integrally with and extends downward vertically from a crank case 3 of the engine E, and a substantially vertical transmission shaft 5 is rotatably supported in the transmission housing 4. The crank case 3 and the transmission housing 4 constitute a transmission case 6 in which a conventional type of transmission gear is housed, and a crank shaft 7 of the engine E is connected to the transmission shaft 5 via the transmission gear. The lower end of the transmission shaft 5 terminates as an integral small driving bevel gear 8 which engages with a large driven bevel gear 10 secured to a cultivator shaft 9 passing horizontally and rotatably through a lower portion of the transmission housing 4. Tiller tines 11 provided with side discs 12 are fixed at both ends of the shaft 9, outside the transmission housing 4. The transmission shaft 5 is driven by the engine E through the transmission gear, and the rotation of the transmission shaft 5 is transmitted to the cultivator shaft 9 by way of the small driving bevel gear 8 and the large driven bevel gear 10, to drive the tiller tines 11. Thus, the transmission shaft 5, the small driving bevel gear 8 and the large driven bevel gear 10 constitute a transmission mechanism T.

A power take-off shaft 13 which is arranged transversely to the cultivator shaft 9 is borne rotatably through a front wall 4a at a lower portion of the transmission housing 4. The inner end of the power take-off shaft 13 terminates as an integral small driven bevel gear 14 engaging with the large driven bevel gear 10. The outer end of the power take-off shaft 13 projects from the transmission housing 4, and this projecting portion of the shaft 13 is splined. A cover 15 is removably attached by bolts 16 to the lower front side of the transmission housing 4 so as to enclose the outer end of the power take-off shaft 13.

In the cultivator shown in FIGS. 1 and 2, when the engine E is operated, the rotation of its crankshaft 7 is transmitted to the cultivator shaft 9 via the transmission mechanism T, making the tiller tines 11 turn with the corresponding side discs 12, to effect rototilling as the cultivator moves. This tilling mechanism is suitable for relatively rough plowing.

In FIGS. 3 and 4, the cover 15 of the cultivator shown in FIGS. 1 and 2 is removed and the base end of a running wheel unit U is removably secured in a cantilever fashion by a bolt 17 to the front wall 4a of the lower portion of the transmission housing 4 in such a way as to enclose the projecting end of the power take-off shaft 13. A casing 18 of the wheel unit U consists of a hollow cylindrical portion 18a and a gear case 18b formed integrally with the cylindrical portion 18a, at its foremost end. Top opening of the gear case 18b is closed by a cover 19. Within and along the full length of the hollow cylindrical portion 18a, a rotatable interlocking wheel drive transmission shaft 20 extends with its one end splined around its periphery and located facingly to the corresponding end of the power take-off shaft 13. The adjacent ends of the power take-off shaft 13 and the interlocking shaft 20 are spline-connected together by a hollow connector 21. At the other end of the interlocking wheel drive transmission shaft 20, an integral small driving bevel gear 22 is provided for engagement with a large driven bevel gear 23 secured to a wheel axle 24 which is rotatably borne by the gear case 18b and extends therethrough laterally. A pair of running wheels 25 are mounted at both ends of the axle 24. The rotation of the power take-off shaft 13 is transmitted through the connector 21, the interlocking shaft 20, the small driving bevel gear 22, and the large driven bevel gear 23 to the axle 24 so that the axle 24 rotates at a reduced speed, making the pair of running wheels 25 turn accordingly. The connector 21, interlocking shaft 20 and gears 22, 23 constitute an interlocking mechanism I.

In the structure shown in FIGS. 3 and 4, when the engine E is operated, the pair of tiller tines 11, 11 are driven to turn together with the side discs 12, and at the same time the pair of running wheels 25 are also rotated. Thus, this structure can convert the cultivator as shown in FIGS. 1 and 2 into a rotary cultivator which is self-propelled by the running wheels 25. This rotary cultivator is suitable for fine plowing since its running speed is regulated by the running wheels 25.

As described above, the cultivator according to this invention has high versatility in that it can easily be converted from a Rototiller into a rotary cultivator, or vice versa, without changing its cultivating mechanism as including the shaft 9 and tines 11, by merely mounting or dismounting a running wheel unit.

In the rotary cultivator of FIGS. 3 and 4, when the center of gravity of the cultivator body portion B including the engine E and the transmission case 6 is positioned above the line connecting the ground-contact point of each running wheel 25 and the corresponding handle grip 2a, the cultivator body portion B is liable to rock sidewise, disadvantageously increasing the working load on the handles 2 and also lowering the stability of the cultivator.

Figure 5:
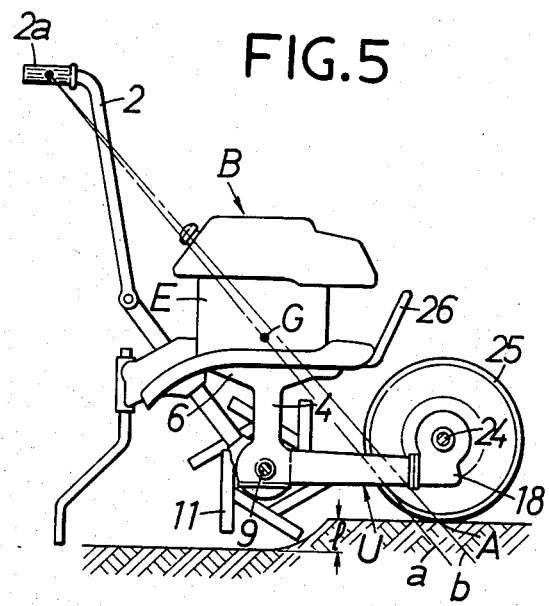
FIG. 5 is a side view of a modified form of the rotary cultivator of FIGS. 3 and 4.

FIG. 5 shows a modified form of the rotary cultivator of FIGS. 3 and 4, which is designed to overcome this problem. In FIG. 5, A indicates the ground-contact point of the running wheels 25, and G the center of gravity of the cultivator body portion B. The wheels 25 are so arranged that their ground-contact point A is positioned forward of the extension a of a line connecting the handle grips 2a and the center of gravity G of the cultivator body portion B, that is to say, the center of gravity G is located below a line b connecting the handle grips 2a and the ground-contact point A of the wheels 25. This arrangement can reduce the sidewise rocking of the body portion B, resulting in an increased cultivator stability as well as easy and expedited cultivating work.

In this modified form, each running wheel 25 is designed of a relatively large diameter so as to provide a better running performance, and also the axle 24 of the wheels 25 is rotatably supported on the front end of the casing 18 of the running wheel unit U at a point offset upward so that a desired plowing depth 1, for example about 10–15 cm, can be ensured.

Figure 6:
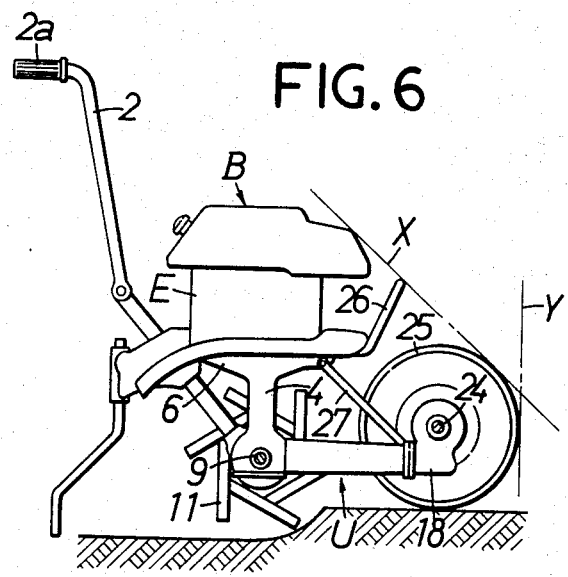
FIG. 6 is a side view of another modified form of the rotary cultivator of FIGS. 3 and 4.
Figure 7:
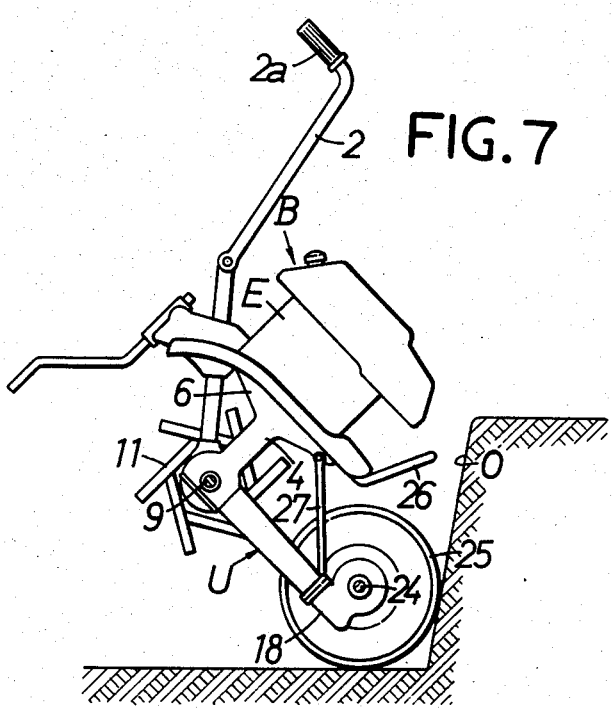
FIG. 7 is a side view of the cultivator of FIG. 6 shown tilted forward.

FIGS. 6 and 7 show another modified form of the rotary cultivator of FIGS. 3 and 4. In this case, the running wheel unit U is specifically mounted on the cultivator body portion B in such a manner that the axle 24 of the running wheels 25 is positioned forward of the front end of the frontguard 26 provided in front of the engine E. A reinforcing bar 27 is also bridged for connection between the front end of the casing 18 of the wheel unit U and a part of the transmission case 6 which forms an upper section of the cultivator body portion B.

In this case, the frontguard 26 is preferably positioned so that it does not project outward from the tangent connecting the engine unit E to the wheels 25. In this modified form, as in the form shown in FIG. 5, the axle 24 of the wheels 25 is rotatably supported on the front end of the casing 18 at a point offset upward.

Further, according to this modified form, when it is required to tilt the cultivator forward with the ground-contact point of each wheel 25 acting as fulcrum, for the purpose of changing the direction of travel of the cultivator, it is possible to incline the cultivator forward to a larger extent until the frontguard 26 reaches the vertical tangent extending from the foremost end of the wheels 25, since the axle 24 is positioned forward of the front end of the frontguard 26. Therefore, when for instance, an obstacle O such as a mound of earth lies just ahead of the cultivator, an operator can change the direction of travel of the cultivator easily and quickly without the frontguard 26 touching the obstacle O, and hence with no fear of damaging the mound with the frontguard 26. Further, since the reinforcing bar 27 is provided between the front end of the casing 18 and the transmission case 6, the strength with which the running wheels 25 are supported is augmented by the truss structure constituted by the cultivator body portion B, the casing 18 and the reinforcing bar 27, so that even if the size of the casing 18 is elongated, sufficient support strength is provided.

What is claimed is:

1. A rototiller-cultivator apparatus comprising a body portion, an engine mounted in said body portion, a transmission housing mounted on a bottom of said engine and extending vertically downward from said engine, a transmission shaft extending vertically downward from said engine through said transmission housing, said transmission shaft being coupled at its upper end to a crankshaft of said engine and mounted adjacent its lower end for rotation about a substantially vertical axis in said transmission housing, a cultivator tine shaft extending horizontally and laterally through the lower portion of said transmission housing, intermeshing gear means mounted on the lower end of said transmission shaft and on said cultivator tine shaft for driving said cultivator tine shaft when said transmission shaft is driven by said engine, cultivator tines mounted on opposite ends of said cultivator tine shaft for rotation with said cultivator tine shaft when said cultivator tine shaft is driven by said transmission shaft, a power take-off shaft mounted in the lower portion of said transmission housing transversely to said cultivator tine shaft and extending forwardly of said transmission housing with an output end of the power take-off shaft being protruded out of the housing, gear means mounted on said power take-off shaft and intermeshing with said gear means mounted on the lower end of said transmission shaft for driving said power take-off shaft when said transmission shaft is driven by said engine, and a wheel unit for mounting on said lower portion of said transmission housing for direct interconnection with the output end of said power take-off shaft when said apparatus is used as a cultivator, said wheel unit including a casing mounted on said lower portion of said transmission housing over the output end of said power take-off shaft and extending forwardly therefrom transversely to said cultivator tine shaft, a wheel drive transmission shaft having an input end and an output end and coupled at the input end to said power take-off shaft and extending forwardly through said casing, a wheel axle extending horizontally and laterally through a forward portion of said casing adjacent the output end of said wheel drive transmission shaft, running wheels mounted on opposite ends of said axle for rotation therewith and intermeshing gear means mounted on the output end of said wheel drive transmission shaft and said axle for driving said axle and said wheels when said transmission shaft is driven by said engine and drives said cultivator tine shaft and tines, said power take-off shaft and said wheel drive transmission shaft, wherein when said wheel unit is detached from the transmission housing, said apparatus is used as a rototiller.

2. An apparatus as set forth in claim 1, wherein said intermeshing gear means mounted on said transmission shaft and said cultivator tine shaft drives said tines at a speed higher than the speed of said running wheels on said wheel axle.

3. An apparatus as set forth in claim 1, wherein when said apparatus is used as a rototiller, said wheel drive transmission shaft is disconnected from said power take-off shaft and the output end of the power take-off shaft is covered by a cover means.

4. An apparatus set forth in claim 1, wherein said intermeshing gear means comprises a small driving bevel gear formed integrally on said lower end of the transmission shaft, a large driven bevel gear formed on the cultivator tine shaft for integral rotation and meshed with said small driving bevel gear, a small driven bevel gear meshed with said large driven bevel gear and integrally formed on said power take-off shaft.

5. An apparatus as set forth in claim 4, wherein when said apparatus is used as a rototiller, said power take-off shaft rotates idly.

6. An apparatus as set forth in claim 1, wherein when said apparatus is used as a rototiller, said power take-off shaft rotates idly.

7. An apparatus as set forth in claim 1, wherein on said body portion are provided handles extending upward and rearward, and said running wheels are positioned so that their ground-contact point is located forward of an extension of a line connected between grips of said handles and the center of gravity of said body portion.

8. An apparatus as set forth in claim 7, wherein a front guard is provided to protect the front side of said engine with a front end of the guard being located forwardly of a front end of the engine, an axle of said running wheels being positioned forward of ihe front end of the front guard.

9. An apparatus as set forth in claim 1, wherein a front guard is provided so as to protect the front side of said engine, and an axle of said running wheels is positioned forward of a front end of said front guard.

10. An apparatus as set forth in claim 1, wherein a reinforcing bar is bridged for connection between the front end of the casing for said wheel unit and an upper part of said body portion.

11. An apparatus as set forth in claim 10, wherein a front guard is provided so as to protect the front side of the engine, and an axle of said running wheels is positioned forward of a front end of said front guard.

12. An apparatus as set forth in claim 1, further comprising a truss structure provided on said body portion for reinforcing said wheel unit.

13. An apparatus as set forth in claim 1, wherein when the mode of operation of said apparatus is changed from a cultivator to a rototiller or vice versa, such change is effected without replacing or modifying the transmission mechanism.

* * * * *